United States Patent
Anders et al.

(10) Patent No.: US 9,456,229 B2
(45) Date of Patent: Sep. 27, 2016

(54) PARSING SINGLE SOURCE CONTENT FOR MULTI-CHANNEL PUBLISHING

(75) Inventors: Kelley Lynne Anders, East New Market, MD (US); Trudy Leigh Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 13/558,480

(22) Filed: Jul. 26, 2012

(65) Prior Publication Data

US 2014/0033262 A1    Jan. 30, 2014

(51) Int. Cl.
*H04N 21/2343* (2011.01)

(52) U.S. Cl.
CPC ................................. *H04N 21/2343* (2013.01)

(58) Field of Classification Search
CPC .................................................. H04N 21/2343
USPC .................. 725/116, 114–115, 138, 144–146
See application file for complete search history.

(56) References Cited

U.S. PATENT DOCUMENTS

| | | | |
|---|---|---|---|
| 2002/0026327 A1 | 2/2002 | Kothari et al. | |
| 2004/0001087 A1 | 1/2004 | Warmus et al. | |
| 2004/0189703 A1 | 9/2004 | Zhang et al. | 345/762 |
| 2005/0021502 A1 | 1/2005 | Chen et al. | 707/2 |
| 2005/0262063 A1* | 11/2005 | Conboy et al. | 707/3 |
| 2007/0133609 A1 | 6/2007 | Moore et al. | |
| 2008/0300863 A1 | 12/2008 | Smith | 704/9 |
| 2008/0301670 A1 | 12/2008 | Gouge et al. | |
| 2009/0138972 A1* | 5/2009 | Scales | 726/24 |
| 2009/0144392 A1* | 6/2009 | Wang et al. | 709/217 |
| 2010/0125796 A1 | 5/2010 | Sato et al. | 715/733 |
| 2011/0191702 A1 | 8/2011 | Lunsford | 715/763 |
| 2011/0213670 A1* | 9/2011 | Strutton et al. | 705/14.73 |
| 2011/0238688 A1 | 9/2011 | Mercuri et al. | |
| 2012/0054278 A1* | 3/2012 | Taleb et al. | 709/204 |
| 2012/0150680 A1 | 6/2012 | Golus et al. | 705/26.5 |
| 2012/0179958 A1* | 7/2012 | Tarjan | 709/204 |

FOREIGN PATENT DOCUMENTS

WO    2009037663 A2    3/2009

OTHER PUBLICATIONS

International Search Report for International Application No. PCT/CA2013/050487, mailed Sep. 24, 2013, 4 pages.

\* cited by examiner

*Primary Examiner* — Randy Flynn
(74) *Attorney, Agent, or Firm* — VanLeeuwen & VanLeeuwen; Stephen R. Yoder (57) ABSTRACT

An approach is provided in which a content manager receives a publication request to publish content data on a particular distribution channel. The content manager identifies one or more channel format parameters corresponding to the selected distribution channel and dynamically formats the content data according to the identified channel format parameters, which results in formatted content data. In turn, the content manager publishes the dynamically formatted content data on the selected distribution channel.

22 Claims, 10 Drawing Sheets

| Channel Parameter Table 700 | | | | | |
|---|---|---|---|---|---|
| Channel ID | Image Parameters | Video/Duration | Character Limits | Font Parameters | Grammatical Style |
| A | Not Allowed | Abbreviated | 100 | Helv 12 | Abbreviated |
| B | Original Sizing | 2 Minutes Max. | None | Any | Technical |
| C | Min Sizing | 30 Sec. Max | 300 | Arial 9 | Casual |
| D | Not Allowed | Not Allowed | None | SBCS | Technical |
| E | Max Res. 1280x1020 | 5 Minutes Max. | 500 | SBCS and DBCS | Casual/ Technical |

| Content Location Table 800 |||
| --- | --- | --- |
| Channel ID | Single Source Content ID | Channel-Specific Content Location |
| A | techdoc | http:\\webpagex.24330.e4d |
| B | techdoc | http:\\webpageZ.F47D |
| A | brochure123 | http:\\travelpage.54.134 |
| B | video/abstract/transcript | www.videopage |
| D | video/abstract/transcript | www.channel-D: Abstract and Transcript Only |
| E | video/abstract/transcript | www.channel-E: Video and Abstract Only |

PARSING SINGLE SOURCE CONTENT FOR MULTI-CHANNEL PUBLISHING

BACKGROUND

The present disclosure relates to using channel-specific format parameters to dynamically format single source content data into channel-specific formatted content data and publish on multiple distribution channels.

Various types of distribution channels exist that allow users to publish information, such as technical distribution channels, social media distribution channels, blog distribution channels, etc. These different distribution channels may have different publishing requirements. For example, one distribution channel may allow video and images while another distribution channel may only allow text. In another example, one distribution channel may limit the maximum amount of characters and another distribution channel may allow an unlimited amount of characters. When a content developer wishes to publish content data, the user is faced with formatting the content data in different formats according to each particular distribution channel's format parameters on which the user wishes to publish the content data.

BRIEF SUMMARY

According to one embodiment of the present disclosure, an approach is provided in which a content manager receives a publication request to publish content data on a particular distribution channel. The content manager identifies one or more channel format parameters corresponding to the selected distribution channel and dynamically formats the content data according to the identified channel format parameters, which results in formatted content data. In turn, the content manager publishes the dynamically formatted content data on the selected distribution channel.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
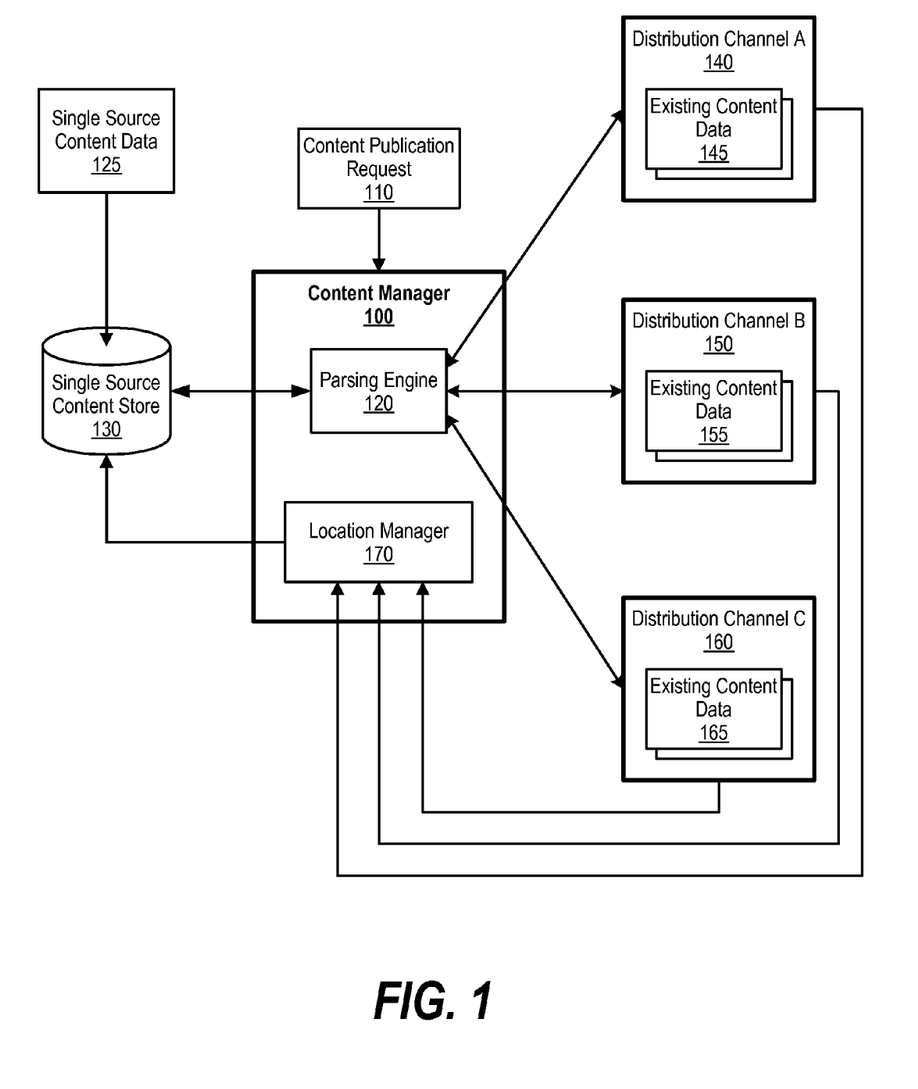
FIG. 1 is a diagram showing a content manager dynamically formatting single source content data and publishing the formatted content data on various distribution channels.

FIG. 1 is a diagram showing a content manager dynamically formatting single source content data and publishing the formatted content data on various distribution channels. Content manager 100 maximizes content formatting and distribution efficiency by formatting single source content data 125 formatted for presentation in selected distribution channels. Additionally, content manager 100 retains a direct link to the formatted content data on each destination channel.

A developer creates single source content data 125 and stores it in single source content store 130. Single source content data 125 may be, for example, an XML document that includes text, video, and images. Content manager 100 receives content publication request 110, which is a request to publish single source content data 125 on one or more distribution channels, content manager 100 determines whether the request corresponds to channel A 140, channel B 150, and/or channel C 160. As those skilled in the art can appreciate, distribution channels referred to herein may include a network location at which end users access content, such as a social media network location, a business network location, a Blog, etc.

Once content manager 110 selects the corresponding channel, content manager 100 checks whether channel format parameters for the selected channel exist in a channel parameter table (e.g., stored in single source content store 130. The channel format parameters may include, for example, a maximum character limit parameter, a video duration parameter, an image parameter, a font parameter, and a grammatical style parameter (see FIG. 7 and corresponding text for further details).

When the channel parameter table does not include the selected channel's format parameters, content manager 100 analyzes existing content located on the selected channel and generates the channel format parameters. For example, channel A 140 may be a social media channel and existing content data 145 may not include images and be limited to 140 characters. As such, content manager 100 generates the appropriate channel format parameters and stores them in the channel parameter table (see FIG. 5 and corresponding text for further details).

In another example, channel B 150 may be a high bandwidth video channel and existing content data 155 includes full resolution video. As such, content manager 100 generates appropriate channel format parameters for channel B 150 and stores them in the channel parameter table. In yet another example, channel C 160 may be a technical chat site and existing content data 165 includes a technical grammatical style with short video clips. As such, content manager 100 generates the appropriate channel format parameters for channel C 160.

Once content manager 100 generates/retrieves channel format parameters for the selected channel, parsing engine 120 retrieves single source content data 125 from single source content store 130 and dynamically formats the single source content data according to the channel format parameters (e.g., limit the number of characters, change video to script, etc.). The formatting may include adapting the terminology, style, and depth of knowledge of single source content data 125 to be in line with the channel format parameters. For example, acronyms may be used on a social media channel with a maximum character limit parameter and, therefore, parsing engine 120 may replace regular text with acronyms.

Once formatted, parsing engine 120 sends the formatted content data to the selected channel 140, 150, or 160 for publication. When content publication request 110 identifies multiple distribution on which to publish content, content manager 100 may dynamically format single source content data 125 multiple ways in order to adhere to different channel format parameters of the different distribution channels.

Content manager 100 sends a location request to the distribution channels that are publishing the formatted content data, requesting the location of the published content on the distribution channel. In turn, location manager 170 receives a response from the distribution channels that include location information, such as a URL corresponding to the formatted content data. In turn, location manager 170 stores the location information in a location table in single source content store 130, thus linking single source content data 125 to the formatted content data's location at the distribution channels (see FIG. 6 and corresponding text for further details).

Figure 2:
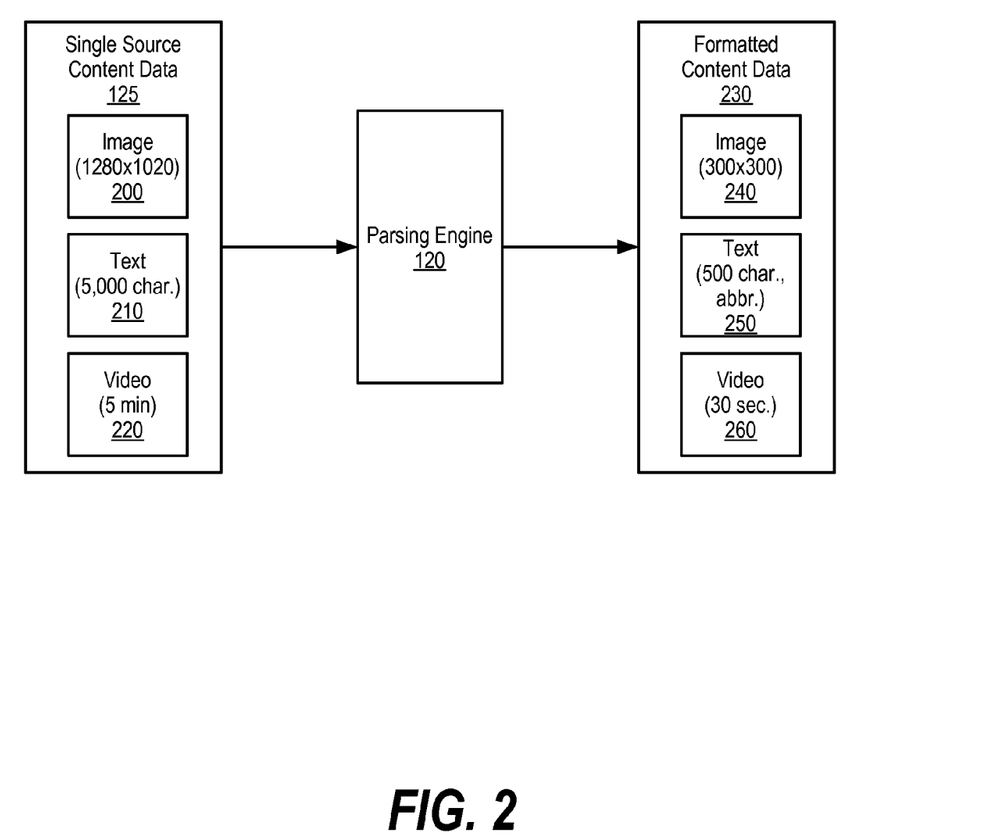
FIG. 2 is a diagram showing an example of a parsing engine creating formatted content data from single source content data.

FIG. 2 is a diagram showing an example of a parsing engine creating formatted content data from single source content data. The example in FIG. 2 shows that single source content data 125 includes image 200, text 210, and video 220. Parsing engine 120 retrieves channel format parameters corresponding to a distribution channel and dynamically formats single source content data 125, thus creating formatted content data 230.

The example shown in FIG. 2 shows that parsing engine 120 converted image 200's resolution from 1280×1020 to image 240 with a resolution of 300×300. Parsing engine 120 also converted text 210 with 5,000 characters to text 250 with 500 characters and abbreviations, and converted video 220 with a five minute duration to video 260 with a 30 second duration.

In one embodiment, parsing engine 120 converts video to a lesser duration by capturing a beginning section of a video clip. In another embodiment, parsing engine 120 may capture clips of the original video and piece the clips together to create a shortened version of the video.

Figure 3:
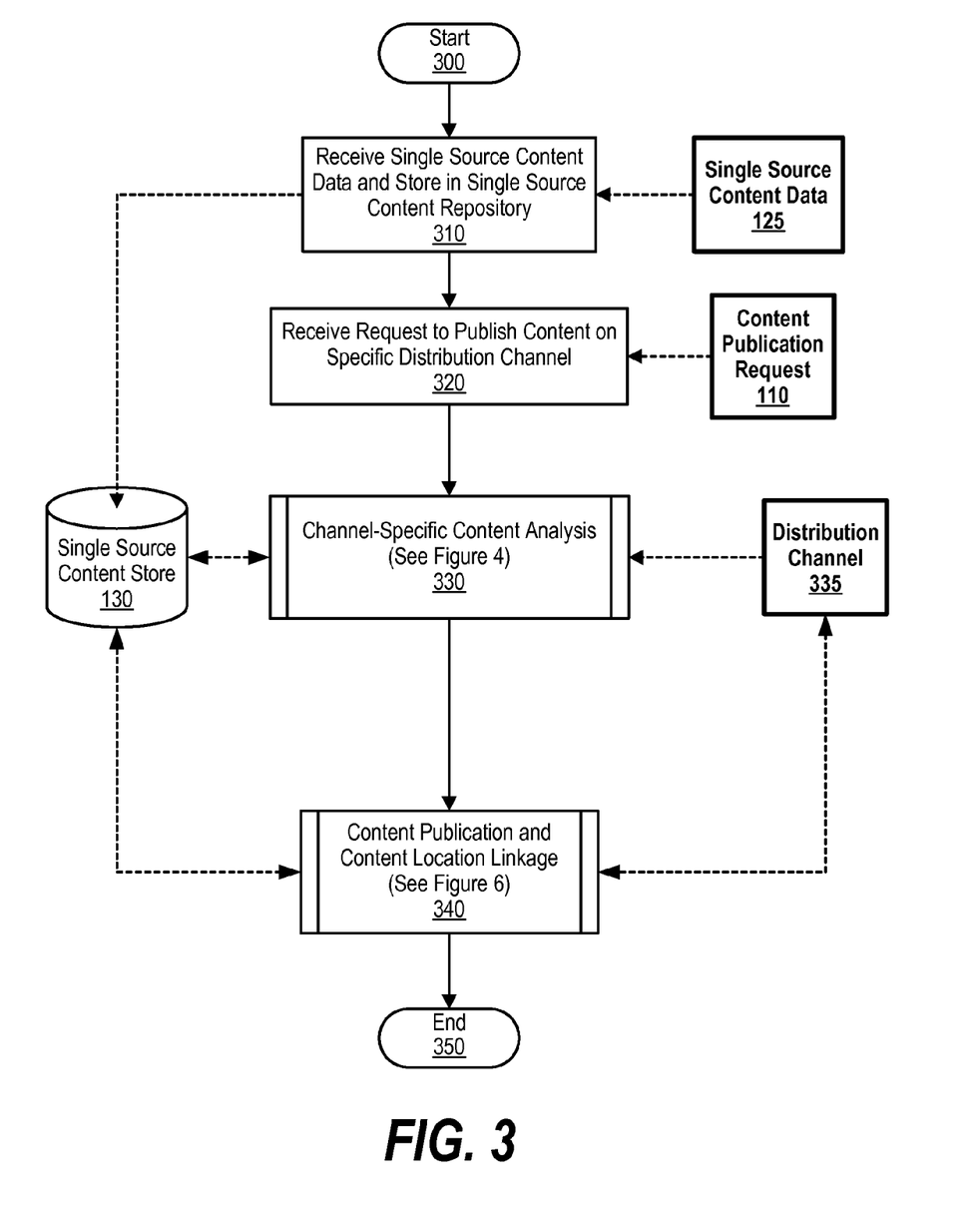
FIG. 3 is a flowchart showing steps taken in dynamically formatting single source content data and publishing channel-specific formatted content data.

FIG. 3 is a flowchart showing steps taken in dynamically formatting single source content data and publishing channel-specific formatted content data. Processing commences at 300, whereupon processing receives single source content data 125 and stores it in single source content store 130.

At step 320, processing receives a request to publish content data on a particular distribution channel (channel 335), such as a social media channel. As such, processing accesses distribution channel 335 (i.e. the requested channel) to analyze existing content data stored on channel 335 and generate the channel format parameters accordingly, which are stored in single source content store 130. In one embodiment, processing checks a channel format table included in single source content store 130 to determine whether channel format parameters for distribution channel 335 were previously generated (pre-defined process block 330, see FIG. 4 and corresponding text for further details).

In turn, processing uses the channel format parameters to dynamically format the single source content data and publish the formatted content data on distribution channel 335. In one embodiment, processing acquires location address location information from channel 335 as to the formatted content data's location, which processing links to the single source content data in single source content store 130 (pre-defined process block 340, see FIG. 6 and corresponding text for further details). Processing ends at 350.

Figure 4:
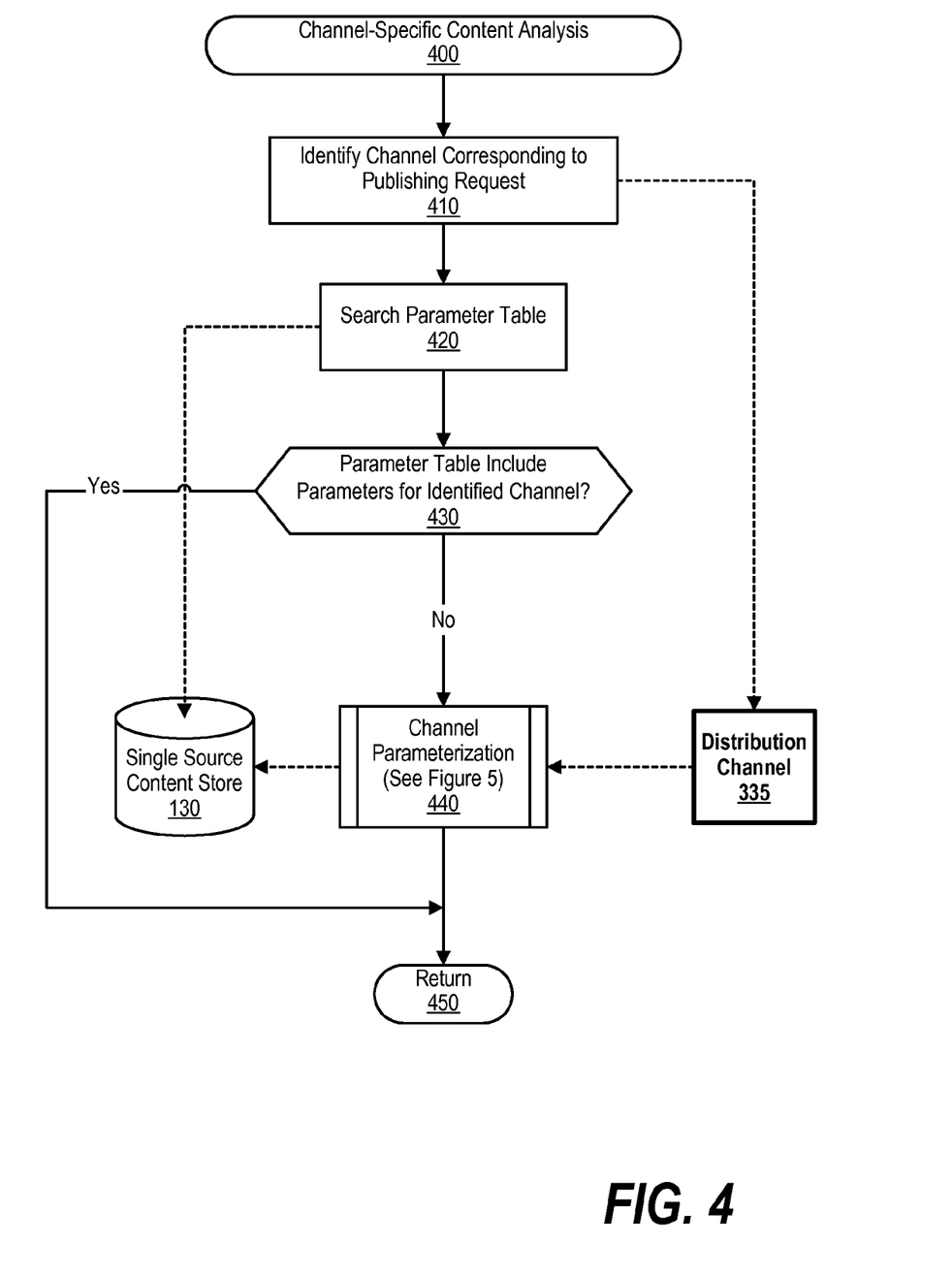
FIG. 4 is a flowchart showing steps taken in identifying a channel corresponding to a publication request and acquiring channel format parameters.

FIG. 4 is a flowchart showing steps taken in identifying a channel corresponding to a publication request and acquiring channel format parameters. Processing commences at 400, whereupon processing identifies channel 335, from multiple available channels, that corresponds to the publication request (step 410).

Figure 7:
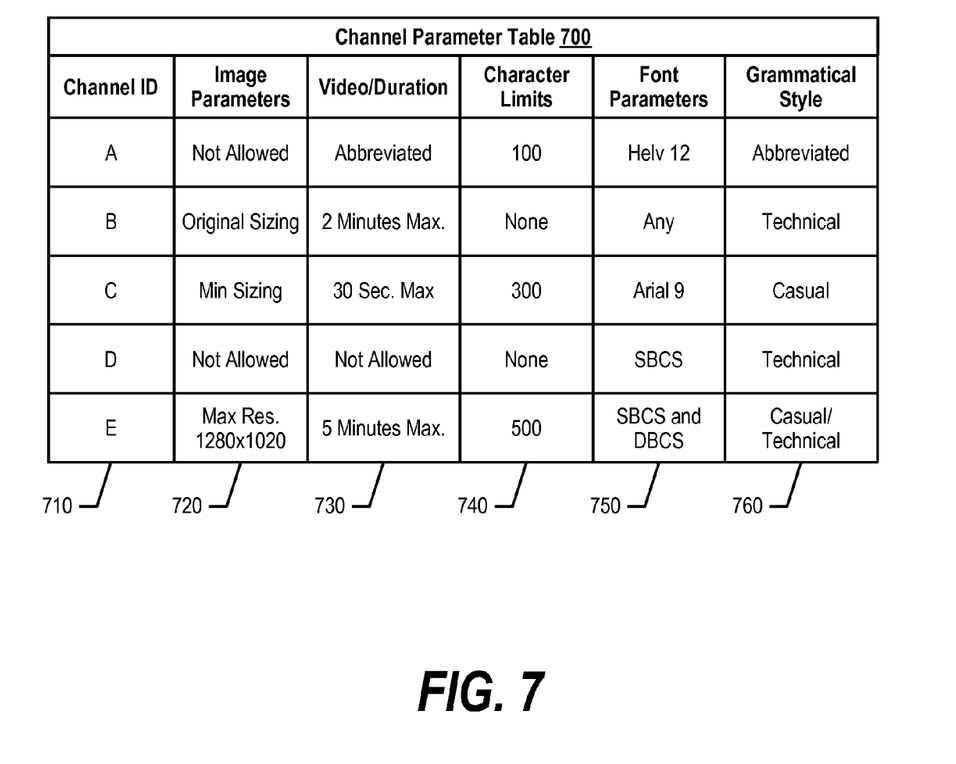
FIG. 7 is an exemplary table showing various channel format parameters.

At step 420, processing searches a channel parameter table in single source content store 130 for channel format parameters corresponding to channel 335 (see FIG. 7 and corresponding text for further details). A determination is made as to whether the channel parameter table includes a table entry for channel 335 (decision 430).

Figure 5:
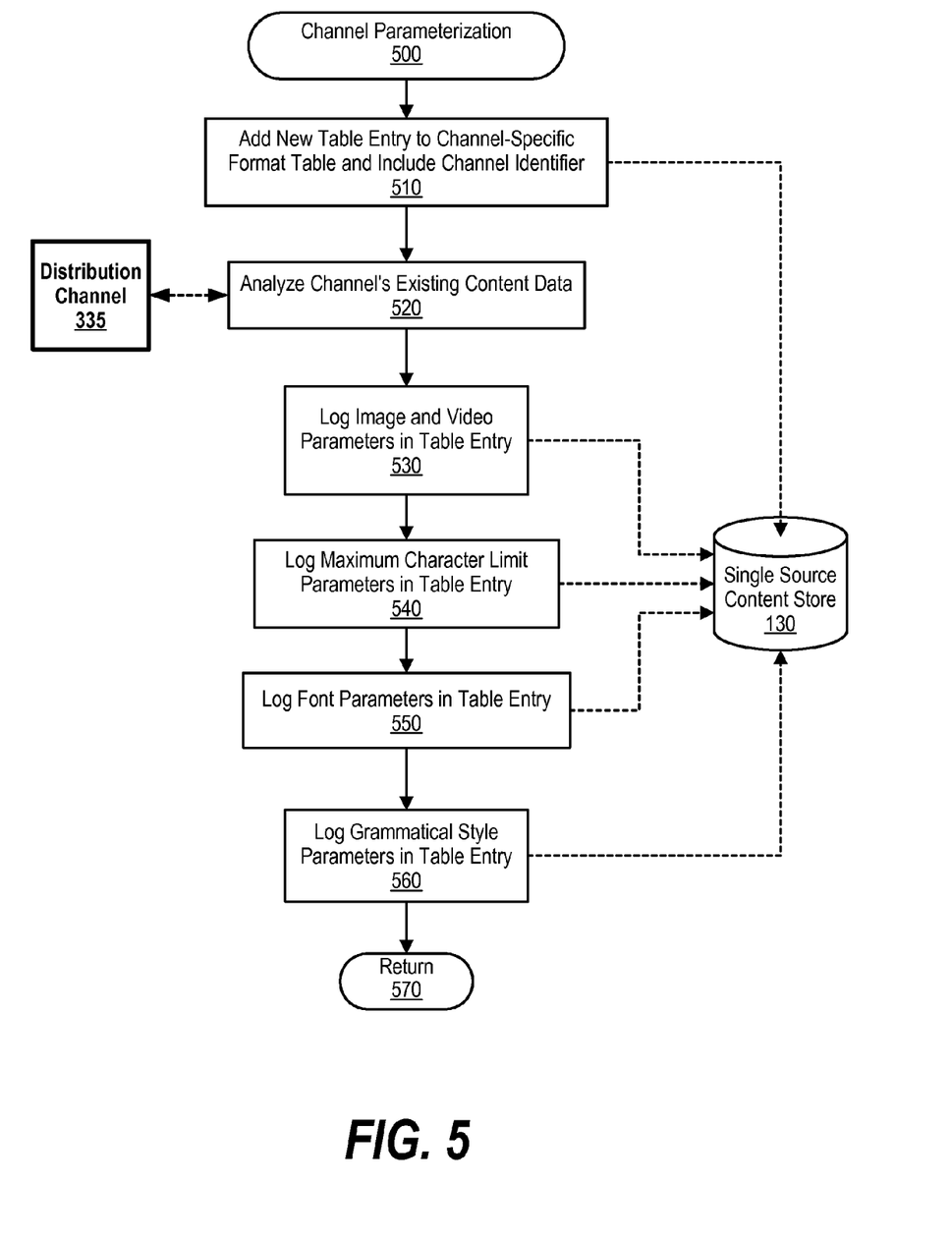
FIG. 5 is a flowchart showing steps taken in creating channel format parameters by analyzing existing content located on a distribution channel.

If the channel parameter table does not include a table entry for channel 335, decision 430 branches to the "No" branch, whereupon processing accesses existing content on channel 335 and generates channel format parameters, which are stored as a table entry in the channel parameter table located in single source content store 130 (pre-defined process block 440, see FIG. 5 and corresponding text for further details).

Figure 6:
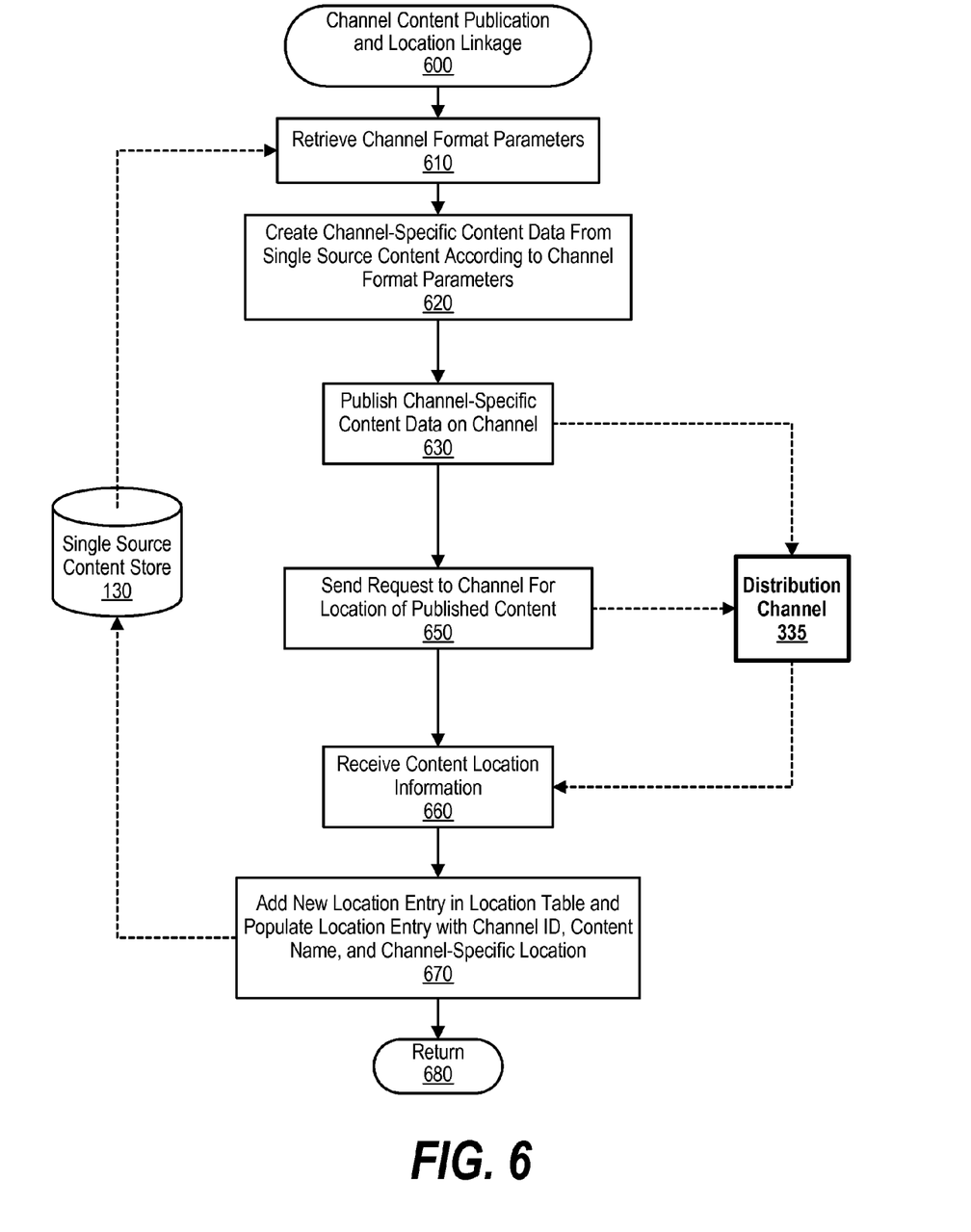
FIG. 6 is a flowchart showing steps taken in publishing formatted content data and linking a channel-specific content location to the single source content.

On the other hand, if the channel parameter table already includes the channel format parameters for channel 335, decision 430 branches to the "Yes" branch, bypassing step 440 to use the stored channel formation parameters during the dynamic formatting process (see FIG. 6 and corresponding text for further details). Processing returns at 450.

FIG. 5 is a flowchart showing steps taken in creating channel format parameters by analyzing existing content located on a distribution channel. Processing commences at 500, whereupon processing adds a table entry to the channel parameter table located in single source content store 130 (step 510). A step 520, processing analyzes existing content located on channel 335. For example, processing may retrieve a sample of existing content data and check for trends in image/video properties and textual properties.

Based on the analysis, processing logs image and/or video parameters in the newly created table entry at step 530. In one embodiment, the image parameters may include an allowable size of an image and/or an allowable video duration (see FIG. 7 and corresponding text for further details). At step 540, processing logs a maximum character limit in the table entry based upon the analysis in step 520. For example, processing may determine that none of the existing content data exceeds 140 characters, or processing may determine that the particular distribution channel does not require a limited number of characters for published content.

At step 550, processing logs font parameters in table entry 550, such as a particular style, size, and/or whether single byte character spaces (SBCS) and/or double byte character spaces (DBCS) are utilized in the existing content data. Processing, at step 560, logs a grammatical style in the table entry that is identified in the existing content data. For example, the grammatical style may be an abbreviated style (includes acronyms), a technical style, or a casual style (see FIG. 7 and corresponding text for further details). Processing returns at 570. As those skilled in the art can appreciate, other channel format parameters may be identified and stored than what is discussed herein.

FIG. 6 is a flowchart showing steps taken in publishing formatted content data and linking a channel-specific content location to the single source content. Processing commences at 600, whereupon processing retrieves channel format parameters corresponding to channel 335 from single source content sore 130 (step 610). At step 620, processing creates a channel-specific content data from the single source content according to the channel format parameters. For example, if a video is being published to a non-video channel, then only the transcript from the video is published. Similarly, if creating a piece of content on a channel which has a 100 character limit, name of products or terms could be abbreviated, such as WebSphere® Application Server is converted to WAS. In another example, technical content may be posted in full on a blog, but an abstract of the context would be parsed on a distribution channel with maximum character limits (e.g., identifying terms/words to abbreviate/shorten).

Processing sends the formatted content data to channel 335 at step 630 for publication. At step 650, processing sends a content location request to channel 335, requesting the location of the newly published formatted content data. Processing receives content location information from channel 335 at step 660, such as a URL to access the formatted content data on channel 335.

Figure 8:
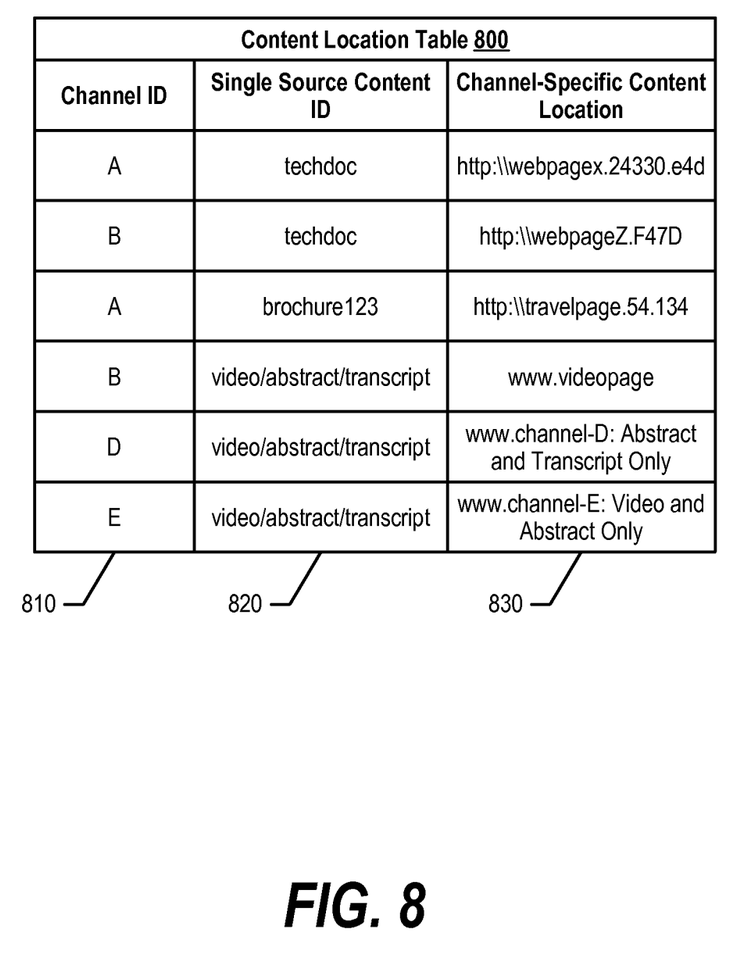
FIG. 8 is an exemplary table showing channel-specific content location information.

At step 670, processing adds a new location entry in a location table stored in single source content store 130 and populates the location entry with, in one embodiment, a channel identifier, a content name, and the channel-specific address location (see FIG. 8 and corresponding text for further details). As those skilled in the art can appreciate, processing may store other information in the location table to identify the published formatted content data. Processing returns at 680.

FIG. 7 is an exemplary table showing various channel format parameters. Channel parameter table 700 includes columns 710-760, each of which includes different content formatting parameters according to a particular channel whose channel identifier is located in column 710.

Column 720 includes a list of image parameters corresponding to the particular channels. Table 700 shows that some channels do not allow images; some channels allow images that are a minimum size, and other channels allow maximum resolution images. Parsing engine 120 utilizes these image parameters to resize single source content data images accordingly.

Column 730 includes video duration parameters. Some channels allow video content with a maximum time duration while other channels do not allow video content data. In one embodiment, for those channels that do not allow video content data, parsing engine 120 translates the audio portion of the video to script and includes the script (or a portion of) in the formatted content data to get published.

Column 740 includes a list of maximum character limit parameters. Table 700 shows that some channels have a maximum character limit while other channels do not have a maximum character limit. Column 750 includes a list of font parameters, which may specify a particular font, size, and/or whether a particular channel allows single byte character spacing (SBCS) and/or double byte character spacing (DBCS).

Column 760 includes a list of grammatical style parameters, which may include an abbreviated style, technical style, and/or casual style. As those skilled in the art can appreciate, channel format table 700 may include other types of channel format parameters and values than what is shown in channel format table 700.

FIG. 8 is an exemplary table showing channel-specific content location information. Table 800 includes columns 810-830, which include location information of formatted content data that is published on particular channels.

Column 810 includes a channel identifier that identifies the particular channel, and column 820 identifies the single source content data that was reformatted. As can be seen, a single source content data may be dynamically formatted differently for different channels (e.g., techdoc is formatted and published on both channel A and channel B, which may have different channel format parameters).

Column 830 includes a channel-specific address location, which is a location of the formatted content data at the channel. As such, the content manager is able to link formatted content data that is published on a channel with the single source content data.

Figure 9:
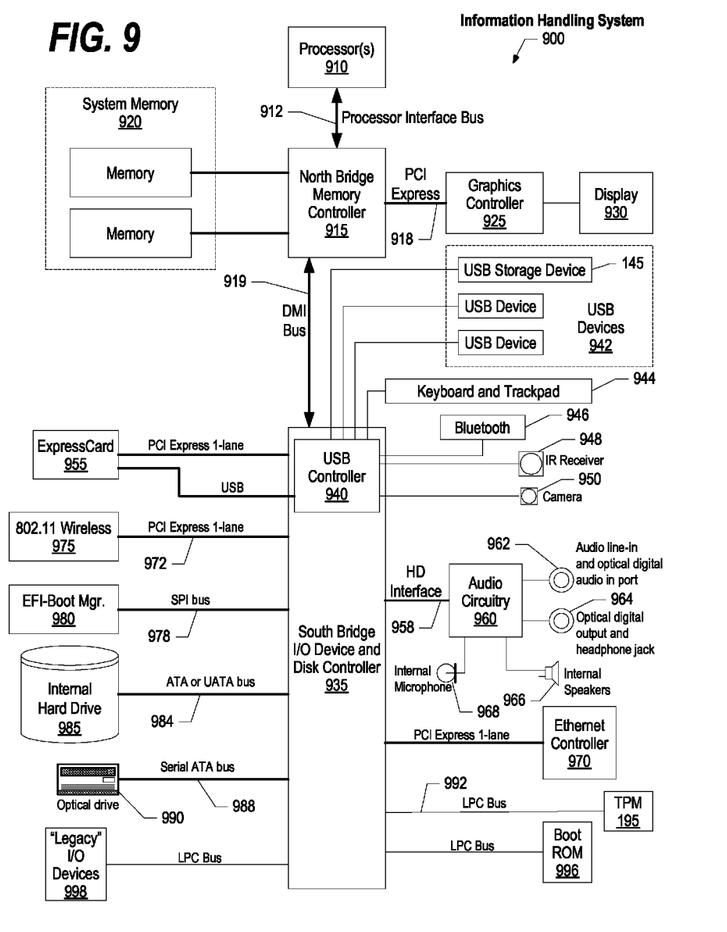
FIG. 9 is a block diagram of a data processing system in which the methods described herein can be implemented.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 995) shown in FIG. 9 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 10.

Figure 10:
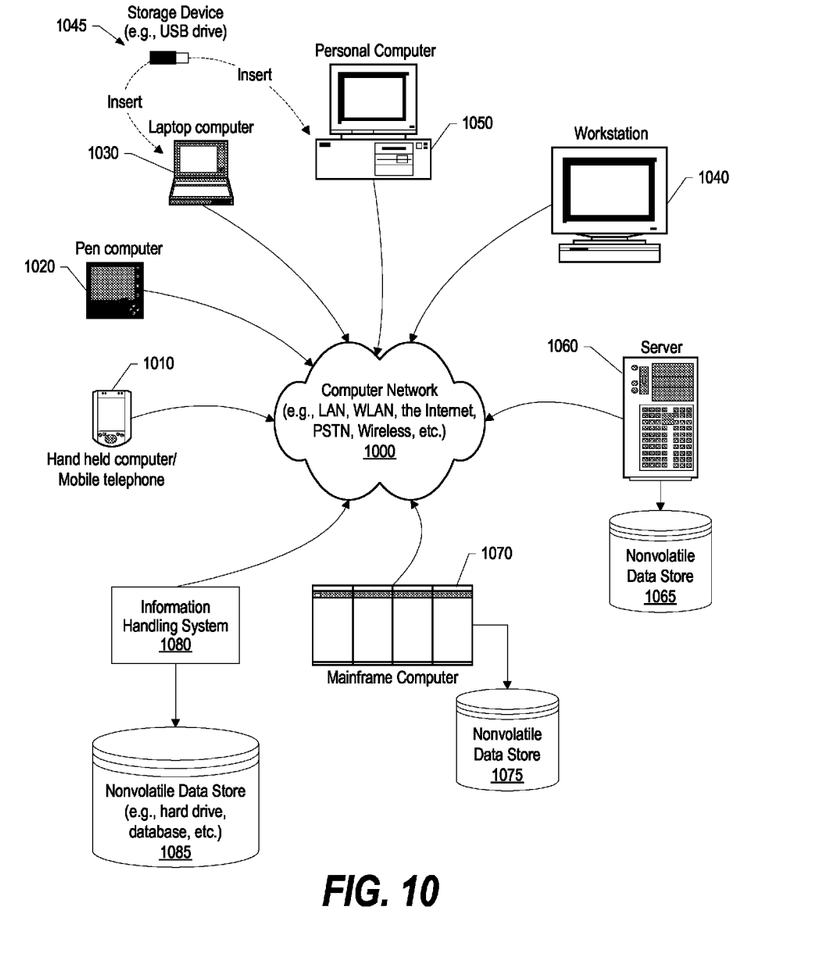
FIG. 10 provides an extension of the information handling system environment shown in FIG. 9 to illustrate that the methods described herein can be performed on a wide variety of information handling systems which operate in a networked environment.

FIG. 10 provides an extension of the information handling system environment shown in FIG. 9 to illustrate that the methods described herein can be performed on a wide variety of information handling systems that operate in a networked environment. Types of information handling systems range from small handheld devices, such as handheld computer/mobile telephone 1010 to large mainframe systems, such as mainframe computer 1070. Examples of handheld computer 1010 include personal digital assistants (PDAs), personal entertainment devices, such as MP3 players, portable televisions, and compact disc players. Other examples of information handling systems include pen, or tablet, computer 1020, laptop, or notebook, computer 1030, workstation 1040, personal computer system 1050, and server 1060. Other types of information handling systems that are not individually shown in FIG. 10 are represented by information handling system 1080. As shown, the various information handling systems can be networked together using computer network 1000. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 10 depicts separate nonvolatile data stores (server 1060 utilizes nonvolatile data store 1065, mainframe computer 1070 utilizes nonvolatile data store 1075, and information handling system 1080 utilizes nonvolatile data store 1085). The nonvolatile data store can be a component that is external to the various information handling systems or can be internal to one of the information handling systems. In addition, removable nonvolatile storage device 945 can be shared among two or more information handling systems using various techniques, such as connecting the removable nonvolatile storage device 945 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving, by one or more processors, a publication request to publish content data on a selected distribution channel;
   generating, by one or more of the processors, one or more channel format parameters based upon analysis of existing content data published on the selected distribution channel;
   formatting, by one or more of the processors, the content data according to the one or more channel format parameters, resulting in formatted content data; and
   publishing the formatted content data on the selected distribution channel.

2. The method of claim 1 wherein the formatting includes altering the content data, and wherein the altering is selected from the group consisting of changing a word to an acronym, changing an image to text, and changing a video to a script.

3. The method of claim 1 wherein the selected distribution channel is one of a plurality of distribution channels that are heterogeneous, the method further comprising:
   retrieving the content data from a single source content repository;
   retrieving a set of different channel format parameters for each of the plurality of distribution channels;
   formatting, for each of the plurality of distribution channels, the content data utilizing the different channel format parameters, resulting in a plurality of heterogeneously formatted content data; and
   publishing each of the plurality of heterogeneously formatted content data on their corresponding one of the plurality of distribution channels.

4. The method of claim 1 wherein the selected distribution channel is a social media channel, the method further comprising:
   determining that one of the channel format parameters identifies a maximum character limit; and
   wherein the formatted content data adheres to the maximum character limit.

5. The method of claim 1 wherein the content data is located in a single source content repository, the method further comprising:
   sending a location request to the selected distribution channel;
   receiving channel-specific content location information from the selected distribution channel at which the formatted content data is stored; and
   storing the channel-specific content location information in the single source content repository.

6. The method of claim 5 wherein the stored channel-specific content location information includes a channel identifier, a content name, and a channel-specific address location.

7. The method of claim 1 wherein at least one of the channel format parameters is selected from the group consisting of an image parameter, a video duration parameter, a maximum character limit, a font parameter, and a grammatical style parameter.

8. An information handling system comprising:
   one or more processors;
   a memory coupled to at least one of the processors;
   a set of computer program instructions stored in the memory and executed by at least one of the processors in order to perform actions of:
   receiving, by one or more processors, a publication request to publish content data on a selected distribution channel;
   generating, by one or more of the processors, one or more channel format parameters based upon analysis of existing content data published on the selected distribution channel;
   formatting, by one or more of the processors, the content data according to the one or more channel format parameters, resulting in formatted content data; and
   publishing the formatted content data on the selected distribution channel.

9. The information handling system of claim 8 wherein the formatting includes altering the content data, and wherein the altering is selected from the group consisting of changing a word to an acronym, changing an image to text, and changing a video to a script.

10. The information handling system of claim 8 wherein the selected distribution channel is one of a plurality of distribution channels that are heterogeneous, and wherein the processors perform additional actions comprising:
    retrieving the content data from a single source content repository;
    retrieving a set of different channel format parameters for each of the plurality of distribution channels;
    formatting, for each of the plurality of distribution channels, the content data utilizing the different channel format parameters, resulting in a plurality of heterogeneously formatted content data; and
    publishing each of the plurality of heterogeneously formatted content data on their corresponding one of the plurality of distribution channels.

11. The information handling system of claim 8 wherein the selected distribution channel is a social media channel, and wherein the processors perform additional actions comprising:
    determining that one of the channel format parameters identifies a maximum character limit; and
    wherein the formatted content data adheres to the maximum character limit.

12. The information handling system of claim 8 wherein the content data is located in a single source content repository, and wherein the processors perform additional actions comprising:
    sending a location request to the selected distribution channel;
    receiving channel-specific content location information from the selected distribution channel at which the formatted content data is stored; and
    storing the channel-specific content location information in the single source content repository.

13. The information handling system of claim 12 wherein the stored channel-specific content location information includes a channel identifier, a content name, and a channel-specific address location.

14. The information handling system of claim 8 wherein at least one of the channel format parameters is selected from the group consisting of an image parameter, a video duration parameter, a maximum character limit, a font parameter, and a grammatical style parameter.

15. A computer program product stored in a non-transitory computer readable storage medium, comprising computer program code that,
    when executed by an information handling system, causes the information handling system to perform actions comprising:
    receiving, by one or more processors, a publication request to publish content data on a selected distribution channel;
    generating, by one or more of the processors, one or more channel format parameters based upon analysis of existing content data published on the selected distribution channel;
    formatting, by one or more of the processors, the content data according to the one or more channel format parameters, resulting in formatted content data; and
    publishing the formatted content data on the selected distribution channel.

16. The computer program product of claim 15 wherein the formatting includes altering the content data, and wherein the altering is selected from the group consisting of changing a word to an acronym, changing an image to text, and changing a video to a script.

17. The computer program product of claim 15 wherein the selected distribution channel is one of a plurality of distribution channels that are heterogeneous, and wherein the information handling system performs additional actions comprising:
- retrieving the content data from a single source content repository;
- retrieving a set of different channel format parameters for each of the plurality of distribution channels;
- formatting, for each of the plurality of distribution channels, the content data utilizing the different channel format parameters, resulting in a plurality of heterogeneously formatted content data; and
- publishing each of the plurality of heterogeneously formatted content data on their corresponding one of the plurality of distribution channels.

18. The computer program product of claim 15 wherein the selected distribution channel is a social media channel, and wherein the information handling system performs additional actions comprising:
- determining that one of the channel format parameters identifies a maximum character limit; and
- wherein the formatted content data adheres to the maximum character limit.

19. The computer program product of claim 15 wherein the content data is located in a single source content repository, and wherein the information handling system performs additional actions comprising:
- sending a location request to the selected distribution channel;
- receiving channel-specific content location information from the selected distribution channel at which the formatted content data is stored; and
- storing the channel-specific content location information in the single source content repository.

20. The computer program product of claim 19 wherein the stored channel-specific content location information includes a channel identifier, a content name, and a channel-specific address location.

21. The computer program product of claim 15 wherein at least one of the channel format parameters is selected from the group consisting of an image parameter, a video duration parameter, a maximum character limit, a font parameter, and a grammatical style parameter.

22. A method comprising:
- receiving, by one or more processors, a publication request to publish content data on a selected distribution channel;
- retrieving the content data from a single source content repository;
- generating, by one or more of the processors, one or more channel format parameters based upon analysis of existing content data published on the selected distribution channel;
- formatting, by one or more of the processors, the content data according to the one or more generated channel format parameters, resulting in formatted content data;
- publishing the formatted content data on the selected distribution channel;
- sending a location request to the selected distribution channel;
- receiving channel-specific content location information from the selected distribution channel at which the formatted content data is stored; and
- storing the channel-specific content location information in the single source content repository.

* * * * *